(12) United States Patent
Chang

(10) Patent No.: US 8,254,107 B2
(45) Date of Patent: Aug. 28, 2012

(54) DISK DRIVE MOUNTING APPARATUS

(75) Inventor: Chin-Ming Chang, Taipei Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 224 days.

(21) Appl. No.: 12/869,783

(22) Filed: Aug. 27, 2010

(65) Prior Publication Data

US 2011/0284705 A1    Nov. 24, 2011

(51) Int. Cl.
*G06F 1/16* (2006.01)
(52) U.S. Cl. ............. 361/679.33; 312/223.2; 248/694; 361/679.37
(58) Field of Classification Search .............. 312/223.2; 248/694; 361/679.31, 679.33, 679.37
See application file for complete search history.

(56) References Cited

U.S. PATENT DOCUMENTS

| | | | | |
|---|---|---|---|---|
| 5,398,157 A | * | 3/1995 | Paul | 361/679.31 |
| 5,768,099 A | * | 6/1998 | Radloff et al. | 361/679.31 |
| 5,995,364 A | * | 11/1999 | McAnally et al. | 361/679.31 |
| 6,754,071 B2 | * | 6/2004 | Lin et al. | 361/679.33 |
| 7,609,508 B2 | * | 10/2009 | Chen et al. | 361/679.33 |
| 2004/0125556 A1 | * | 7/2004 | Chen et al. | 361/685 |
| 2005/0105266 A1 | * | 5/2005 | Wang | 361/685 |
| 2006/0158860 A1 | * | 7/2006 | Green et al. | 361/727 |
| 2007/0242426 A1 | * | 10/2007 | Coster et al. | 361/687 |
| 2008/0116774 A1 | * | 5/2008 | Chen et al. | 312/223.2 |
| 2008/0137281 A1 | * | 6/2008 | Chen et al. | 361/685 |
| 2008/0247130 A1 | * | 10/2008 | Chen | 361/685 |
| 2011/0031362 A1 | * | 2/2011 | Chang | 248/220.21 |
| 2011/0316399 A1 | * | 12/2011 | Chang | 312/223.2 |

* cited by examiner

Primary Examiner — Bradley Duckworth
(74) Attorney, Agent, or Firm — Altis Law Group, Inc.

(57) ABSTRACT

A disk drive mounting apparatus, for a computer case comprising a base plate and a side plate formed at one side of the base plate, includes a supporting bracket and a mounting frame. The side plate defines an L-shaped guiding slot therein. The supporting bracket defines a hooking hole therein. The mounting frame is configured for mounting a disk drive therein. The mounting frame is provided with a guiding post at one side thereof and an L-shaped hook at an opposite side thereof. The guiding post is slidable along and engagable in the guiding slot, and the hook is slidable along the hooking hole and engagable in the supporting bracket in the hooking hole.

13 Claims, 4 Drawing Sheets

DISK DRIVE MOUNTING APPARATUS

BACKGROUND

1. Technical Field

The disclosure generally relates to device mounting, and particularly to a disk drive mounting apparatus for a computer.

2. Description of Related Art

Computers often include a computer case, a disk drive, and a mounting bracket for the disk drive. The disk drive can be, for example, a hard disk drive, a compact disc-read only memory (CD-ROM) drive, or other. The mounting bracket is integrally formed by punching a metal sheet. The disk drive is mounted in the mounting bracket. The mounting bracket is mounted in the computer case by a plurality of copper rivets.

However, once the mounting bracket is mounted in the computer case by the copper rivets, the mounting bracket cannot be removed from the computer case, which renders installation and removal of the disk drive highly inconvenient.

Accordingly, what is needed is a disk drive mounting apparatus which can overcome the limitations described.

BRIEF DESCRIPTION OF THE DRAWINGS

Many aspects of the embodiment(s) can be better understood with reference to the following drawings. The components in the drawings are not necessarily drawn to scale, the emphasis instead placed upon clearly illustrating the principles of the present disclosure. Moreover, in the drawings, like reference numerals designate corresponding parts throughout the several views.

DETAILED DESCRIPTION

Figure 1:
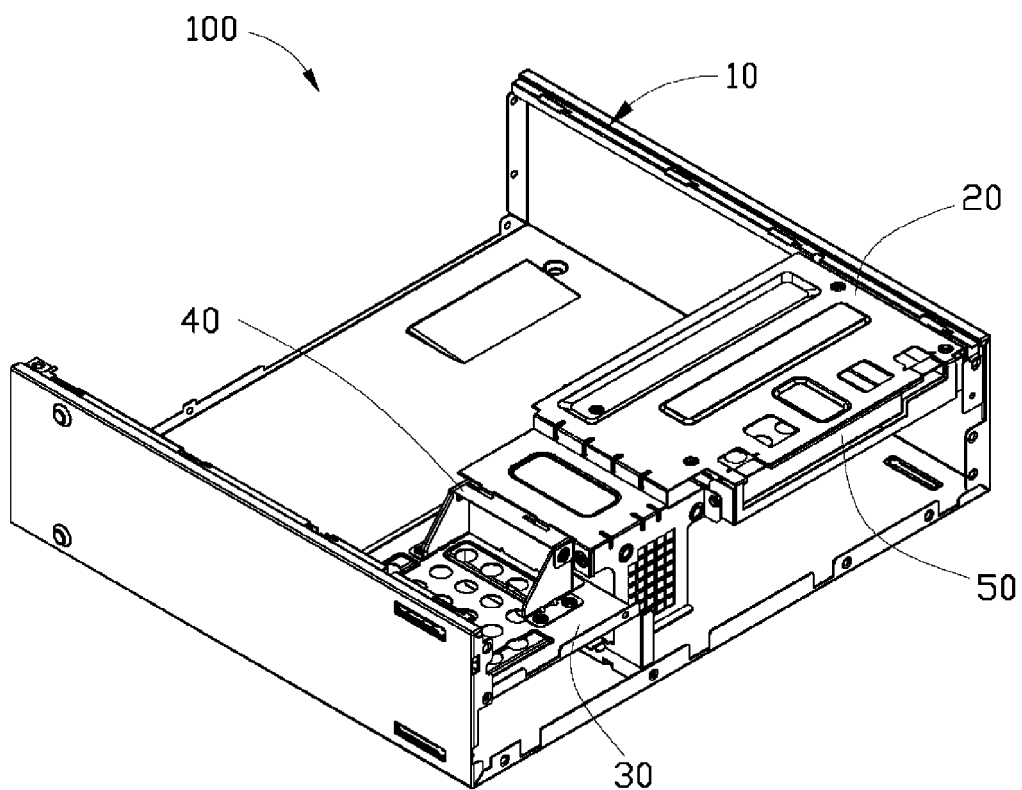
FIG. 1 is an isometric, assembled view of a disk drive mounting apparatus in accordance with an exemplary embodiment of the present disclosure.

Referring to FIG. 1, a disk drive mounting apparatus 100 according to an exemplary embodiment of the present disclosure is shown. The disk drive mounting apparatus 100 includes a mounting frame 20, a fixing frame 30, and a supporting bracket 40. In the present embodiment, the mounting frame 20, fixing frame 30 and supporting bracket 40 are accommodated in a computer case A disk drive 50 is shown mounted in the mounting frame 20.

Figure 2:
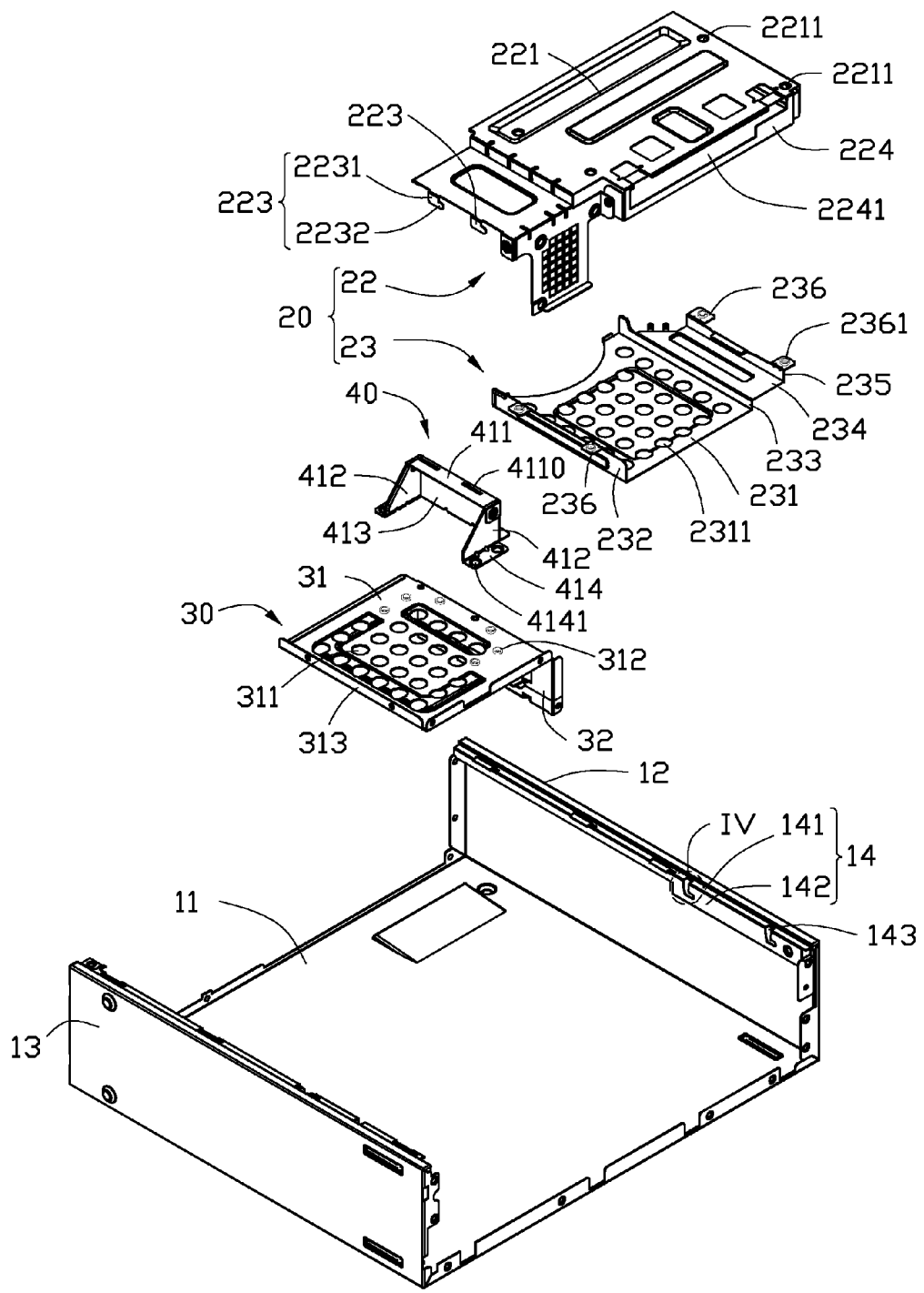
FIG. 2 is an exploded view of the disk drive mounting apparatus of FIG. 1.
Figure 3:
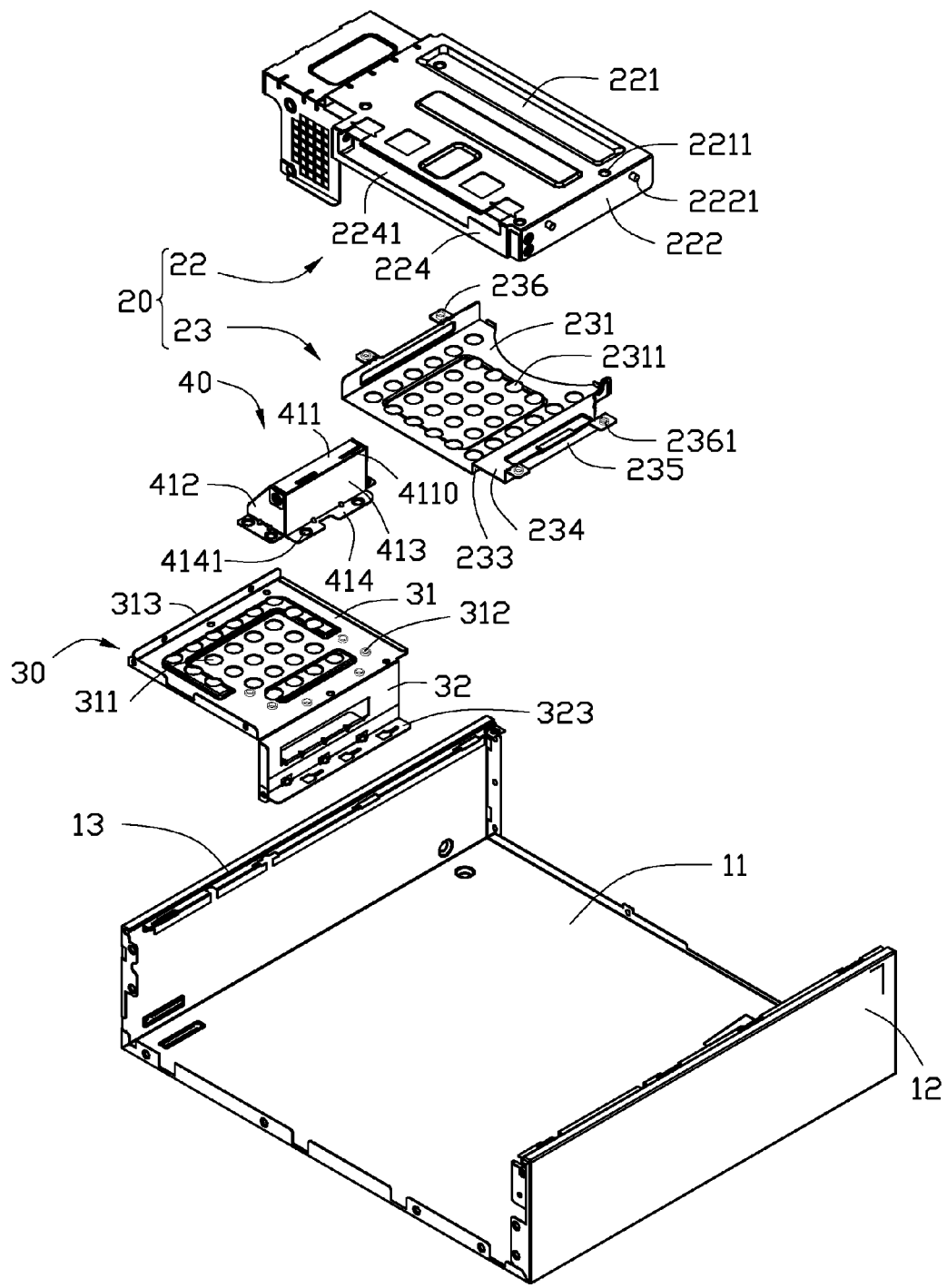
FIG. 3 is an exploded view of the disk drive mounting apparatus of FIG. 1, from a different viewpoint.
Figure 4:
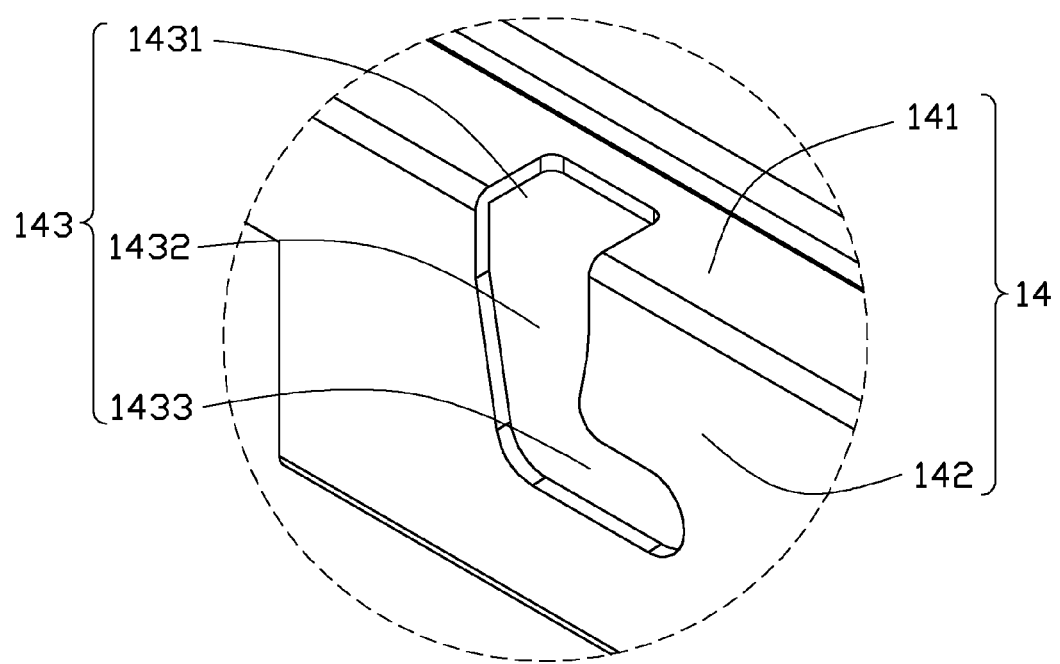
FIG. 4 is an enlarged view of a circled portion IV of FIG. 2.

Referring also to FIGS. 2 through 4, the computer case 10 includes a base plate 11, and a first side plate 12 and a second side plate 13 extending upwardly from two opposite lateral sides of the base plate 11, respectively. The first side plate 12 and the second side plate 13 face each other. A top of the first side plate 12 away from the base plate 11 of the computer case 10 extends towards an inside of the computer case 10 to form an L-shaped guiding flange 14. The guiding flange 14 includes a connecting plate 141 and a guiding plate 142. The connecting plate 141 extends from the top of the first side plate 13 towards the inside of the computer case 10. The guiding plate 142 extends downwardly from the connecting plate 141 towards the base plate 11 of the computer case 10. The guiding plate 142 is parallel to the first side plate 12. The guiding flange 14 defines two L-shaped guiding slots 143 therein. Each of the guiding slots 143 includes a guiding entrance 1431, a first slot section 1432, and a second slot section 1433. The guiding entrance 1431 is defined in the connecting plate 141 of the guiding flange 14. The first slot section 1432 and the second slot section 1433 are defined in the guiding plate 142 of the guiding flange 14. The first slot section 1432 extends downwardly from the guiding entrance 1431 towards the base plate 11 of the computer case 10. The second slot section 1433 extends from a bottom end of the first slot section 1432. The first slot section 1432 faces the guiding entrance 1431. The first slot section 1432 intercommunicates the guiding entrance 1431 and the second slot section 1433.

The mounting frame 20 includes a securing bracket 22 supported by the supporting bracket 40, and a holding bracket 23 secured on the securing bracket 22. The supporting bracket 40 is mounted on the fixing frame 30. The mounting frame 20 is mounted between the supporting bracket 40 and the first side plate 12 of the computer case 10. In the embodiment, two opposite sides of the securing bracket 22 are respectively mounted on the supporting bracket 40 and the first side plate 12 of the computer case 10. Each of the supporting bracket 40, the securing bracket 22 and the holding bracket 23 is manufactured by punching a metal sheet.

The supporting bracket 40 includes a top plate 411, two first supporting plates 412 extending downwardly from two opposite sides of the top plate 411, and a second supporting plate 413 extending downwardly from another side of the top plate 411. The top plate 411 defines two hooking holes 4110 therein. The two hooking holes 4110 are spaced from each other. Each of the two hooking holes 4110 is elongated and extends along a length of the top plate 411. The two first supporting plates 412 are parallel. The second supporting plate 413 is connected between and perpendicular to the two first supporting plates 412. A bottom of each of the first supporting plates 412 and the second supporting plate 413 extends outwardly to form a mounting flange 414. The mounting flange 414 defines two mounting holes 4141 therein.

The securing bracket 22 includes a rectangular securing plate 221. The securing plate 221 defines four through holes 2211 therein at four corners thereof, respectively. A side flange 222 extends downwardly from a lateral side of the securing plate 221. Two guiding posts 2221 protrude outwardly from the side flange 222. The guiding posts 2221 are metal pieces formed on the side flange 222. Two hooks 223 extend downwardly from an opposite lateral side of the securing plate 221. The two hooks 223 are spaced from each other. Each of the hooks 223 is L-shaped. Each hook 223 includes a neck portion 2231 connecting with the securing plate 221, and a hook portion 2232 extending from a bottom end of the neck portion 2231. A panel 224 extends downwardly from a front side of the securing plate 221. The panel 224 defines an opening 2241 therein. The disk drive 50 is received in the securing bracket 22 through the opening 2241.

The holding bracket 23 includes a holding plate 231, and a first positioning plate 232 and a second positioning plate 233 extending upwardly from two opposite lateral sides of the holding plate 231. The holding plate 231 defines a plurality of heat dissipation holes 2311 therein. The holding plate 231 is used for holding the disk drive 50 thereon. The disk drive 50 is positioned between the first positioning plate 232 and the second positioning plate 233. Two mounting ears 236 extend from a top of the first positioning plate 232 away from the holding plate 231. A height of the second positioning plate 233 extending above the holding plate 231 is less than that of the first positioning plate 232 extending above the holding plate 231. A top of the second positioning plate 233, away from the holding plate 231, extends perpendicularly outwardly to form a clapboard 234. The holding plate 231 and the clapboard 234 are respectively located at two opposite sides of the second positioning plate 233. An outer edge of the clapboard 234 extends upwardly to form a third positioning plate 235. The third positioning plate 235 is parallel to the first positioning plate 232 and the second positioning plate 233. Another two mounting ears 236 extend from a top of the third positioning plate 235, away from the clapboard 234. The four mounting ears 236 are respectively positioned at four corners of the holding bracket 23. Each mounting ear 236 is provided with an annular collar 2361 corresponding to the through hole 2211 of the securing bracket 22. The collar 2361 is punched upwardly from the mounting ear 236 with a punching hole (not labeled) defined therein. The collar 2361 extends through a corresponding through hole 2211 of the securing bracket 22 and is riveted in the corresponding through hole 2211 to mount the holding bracket 23 on the securing bracket 22.

The fixing frame 30 is L-shaped, and includes a first mounting plate 31 and a second mounting plate 32 extending downwardly from a lateral side of the first mounting plate 31. The first mounting plate 31 is parallel to the base plate 11 of the computer case 10, and defines a plurality of heat dissipation holes 311 therein. The first mounting plate 31 is provided with a plurality of collars 312 near the second mounting plate 32 corresponding to the mounting hole 4141 of the mounting flange 414 of the supporting bracket 40. The collar 312 extends through the a corresponding mounting hole 4141 of the supporting bracket 40 and riveted in the mounting hole 4141 to mount the supporting bracket 40 on the fixing frame 30. A first abutting flange 313 is formed at another lateral side of the first mounting plate 31 opposite to the second mounting plate 32. The first abutting flange 313 abuts and is mounted on the second side plate 13 of the computer case 10. A second abutting flange 323 is formed at a bottom lateral side of the second mounting plate 32. The second abutting flange 323 abuts and is mounted on the base plate 11 of the computer case 10. The fixing frame 30 is thus mounted in the computer case 10 by the first abutting flange 313 and the second abutting flange 323.

In assembly, the holding bracket 23 of the mounting frame 20 is mounted on the securing bracket 22 by the four mounting ears 236 thereof. The disk drive 50 is inserted through the opening 2241 of the panel 224 into a receiving space defined between the holding bracket 23 and the securing bracket 22, and mounted therein. The two hooks 223 of the securing bracket 22 are respectively inserted into the two hooking holes 4110 of the supporting bracket 40. The two guiding posts 2221 are respectively inserted into the two first slot sections 1432 of the two guiding slots 143 of the computer case 10 through the guiding entrances 1431 of the two guiding slots 143. The securing bracket 22 is moved to slide the neck portion 2231 of each hook 223 along the corresponding hooking hole 4110 of the supporting bracket 40, and to slide each guiding post 2221 along the second slot section 1433 of the corresponding guiding slot 143, until the guiding post 2221 reaches the terminal end of the second slot section 1433 of the guiding slot 143. In this state, the hooking portion 2232 of the hook 223 hooks on the top plate 411 of the supporting bracket 40, and the guiding post 2221 of the securing bracket 22 is engaged in the second slot section 1433 of the guiding slot 143 of the computer case 10.

In disassembly, the securing bracket 22 is moved to slide the neck portion 2231 of each hook 223 along the corresponding hooking hole 4110 of the supporting bracket 40 in an opposite direction; and to slide each guiding post 2221 along the second slot section 1433 towards the first slot section 1432 of the corresponding guiding slot 143, until the guiding post 2221 returns to the first slot section 1432. Then the securing bracket 22 together with the holding bracket 23 can be removed from the supporting bracket 40 and the computer case 10.

In the above-described embodiment, the disk drive mounting apparatus 100 includes a supporting bracket 40, a securing bracket 22, and a holding bracket 23. The disk drive 50 is mounted between the securing bracket 22 and the holding bracket 23, and the securing bracket 22 together with the holding bracket 23 is detachably mounted between the first side plate 12 of the computer case 10 and the supporting bracket 40 by the hooks 223 and the guiding posts 221, thus rendering the installation and removal of the disk drive 50 highly convenient.

It is to be understood, however, that even though numerous characteristics and advantages of the present embodiment have been set forth in the foregoing description, together with details of the structures and functions of the embodiment, the disclosure is illustrative only, and that changes may be made in detail, especially in matters of shape, size, and arrangement of parts within the principles of the embodiment to the full extent indicated by the broad general meaning of the terms in which the appended claims are expressed.

What is claimed is:

1. A disk drive mounting apparatus for a computer case comprising a base plate and a side plate formed at one side of the base plate, the side plate defining at least one L-shaped guiding slot therein, the disk drive mounting apparatus comprising:
   a supporting bracket defining at least one hooking hole therein; and
   a mounting frame configured for mounting a disk drive therein, the mounting frame being provided with at least one guiding post at one side thereof and at least one L-shaped hook at an opposite side thereof, the at least one guiding post being slidable along and engagable in the at least one guiding slot, the at least one hook being slidable along the at least one hooking hole and engagable with the supporting bracket in the at least one hooking hole.

2. The disk drive mounting apparatus of claim 1, wherein the mounting frame comprises a securing bracket comprising a securing plate and a side flange formed at one side of the securing plate, the at least one guiding post protruding outwardly from the side flange, and the at least one hook formed on another side of the securing plate opposite to the side flange.

3. The disk drive mounting apparatus of claim 2, wherein the mounting frame further comprises a holding bracket, mounted on the securing bracket with a receiving space defined between the securing bracket and the holding bracket for receiving the disk drive therein.

4. The disk drive mounting apparatus of claim 3, wherein the securing bracket defines a plurality of through holes therein, the holding bracket is provided with a plurality of mounting ears corresponding to the through holes, and the holding bracket is mounted on the securing bracket through the mounting ears and the through holes.

5. The disk drive mounting apparatus of claim 3, wherein a panel is formed at yet another side of the securing bracket, the panel defining an opening therein via which the disk drive is inserted into the receiving space.

6. The disk drive mounting apparatus of claim 3, wherein the holding bracket comprises a holding plate for holding the disk drive thereon, a first positioning plate formed at one side of the holding plate, and a second positioning plate formed at an opposite side of the holding plate for positioning the disk drive between the first positioning plate and the second positioning plate.

7. The disk drive mounting apparatus of claim 1, wherein the at least one hook comprises a neck portion connecting with the mounting frame and a hooking portion formed at a free end of the neck portion, the hooking hole of the supporting plate is elongated, the neck portion is slidable in the hooking hole, and the hooking portion hooks on the supporting bracket.

8. The disk drive mounting apparatus of claim 7, wherein the supporting bracket comprises a top plate on two opposite sides of which two first supporting plates are formed, and a second supporting plate formed at another side of the top plate, in which the at least one hooking hole is defined.

9. The disk drive mounting apparatus of claim 8, wherein the two first supporting plates and the second supporting plate each are provided with a mounting flange formed thereon, and the flanges are configured for mounting the supporting bracket in the computer case.

10. The disk drive mounting apparatus of claim 1, wherein an L-shaped guiding flange extends from the side plate towards an inside of the computer case, in which the at least one guiding slot is defined.

11. The disk drive mounting apparatus of claim 10, wherein the guiding slot comprises a guiding entrance, a first slot section and a second slot section, wherein the first slot section is perpendicular to the base plate, the second slot section is perpendicular to and communicates with the first slot section, and the at least one guiding post is received in the guiding slot through the guiding entrance and slides into the second slot section through the first slot section and is engaged in the second slot section.

12. The disk drive mounting apparatus of claim 11, wherein the guiding flange comprises a connecting plate connecting with the side plate and a guiding plate extending from the connecting plate towards the base plate of the case, wherein the guiding entrance is defined in the connecting plate, the first slot section and the second slot section are defined in the guiding plate, and the first slot section faces the guiding entrance and connects between the guiding entrance and the second slot section.

13. The disk drive mounting apparatus of claim 1, further comprising a fixing frame mounted on the base plate of the computer case, on which the supporting bracket is mounted.

\* \* \* \* \*

UNITED STATES PATENT AND TRADEMARK OFFICE
CERTIFICATE OF CORRECTION

| | | |
|---|---|---|
| PATENT NO. | : 8,254,107 B2 | Page 1 of 1 |
| APPLICATION NO. | : 12/869783 | |
| DATED | : August 28, 2012 | |
| INVENTOR(S) | : Chang | |

It is certified that error appears in the above-identified patent and that said Letters Patent is hereby corrected as shown below:

Title Page, below Item (65) insert

-- (30)   Foreign Application Priority Data

May 19, 2010 (TW) .........................099116020 --

Signed and Sealed this
Twenty-ninth Day of October, 2013

Teresa Stanek Rea
*Deputy Director of the United States Patent and Trademark Office*